Nov. 10, 1925.  
J. C. BUCKBEE  
1,561,213  
STRAIGHT LINE CEMENT PLANT  
Filed March 23, 1923  
3 Sheets-Sheet 3
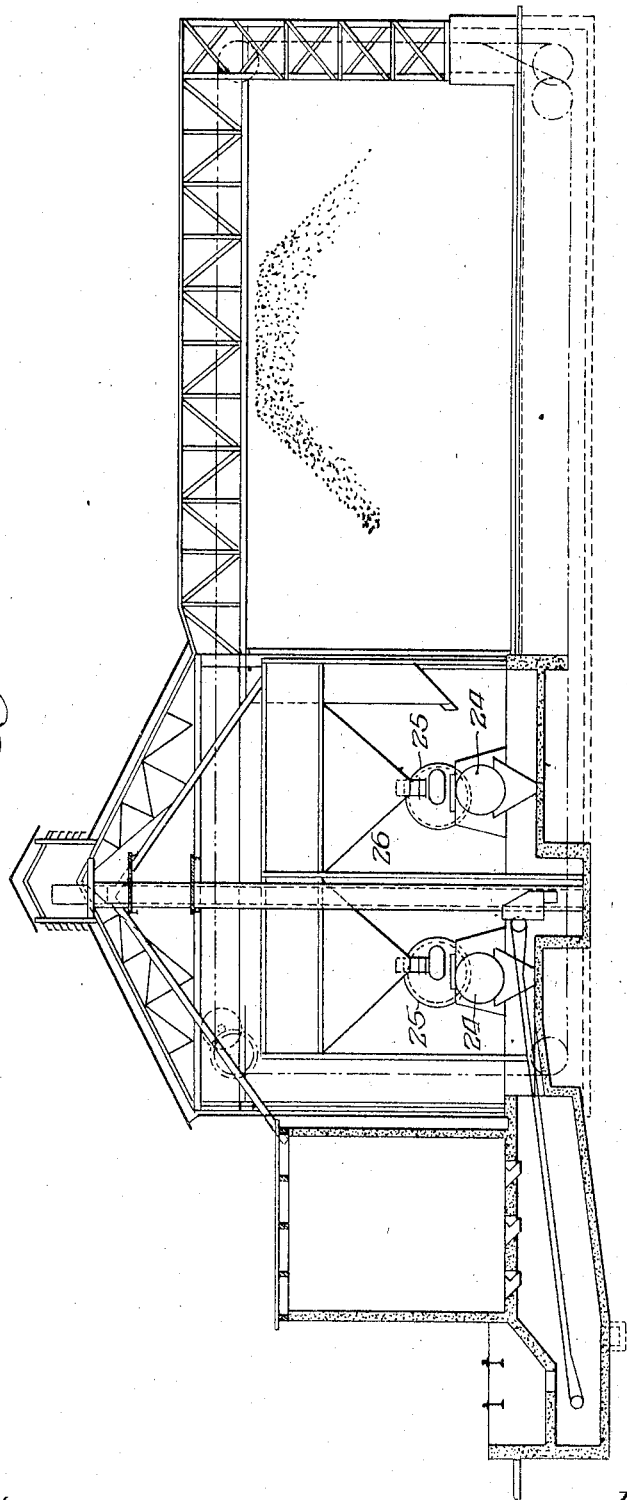

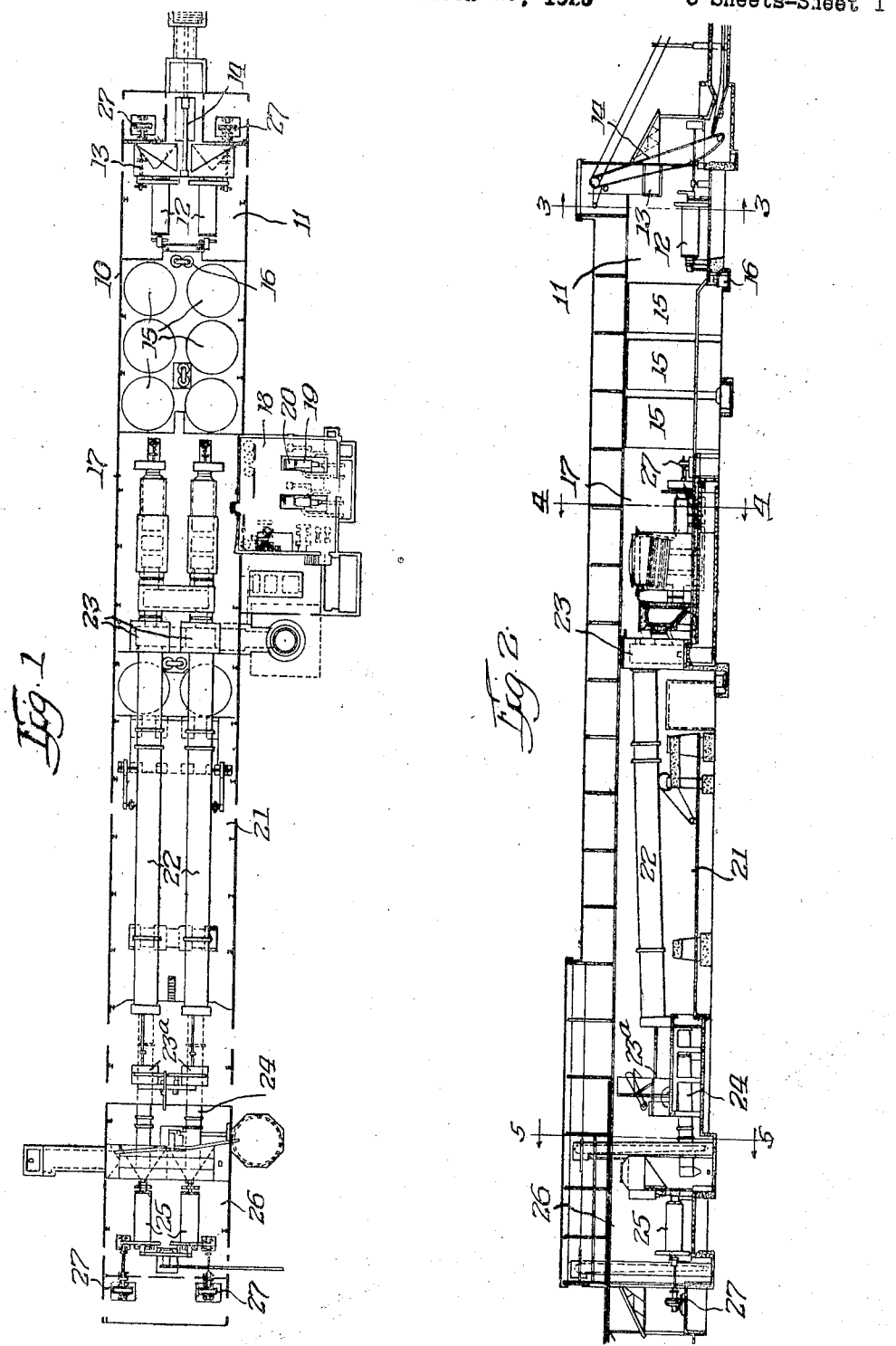

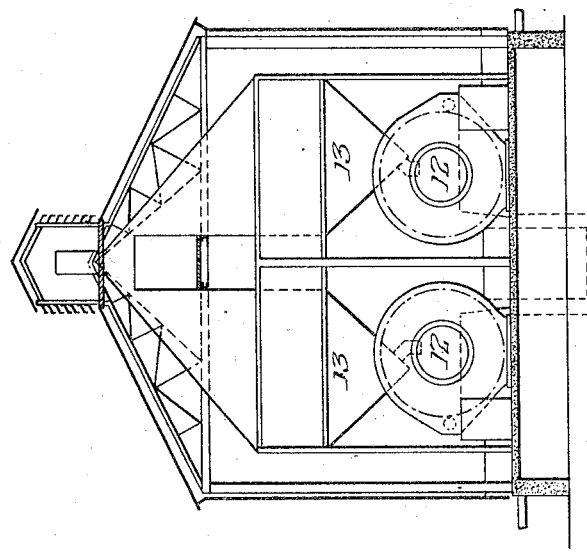
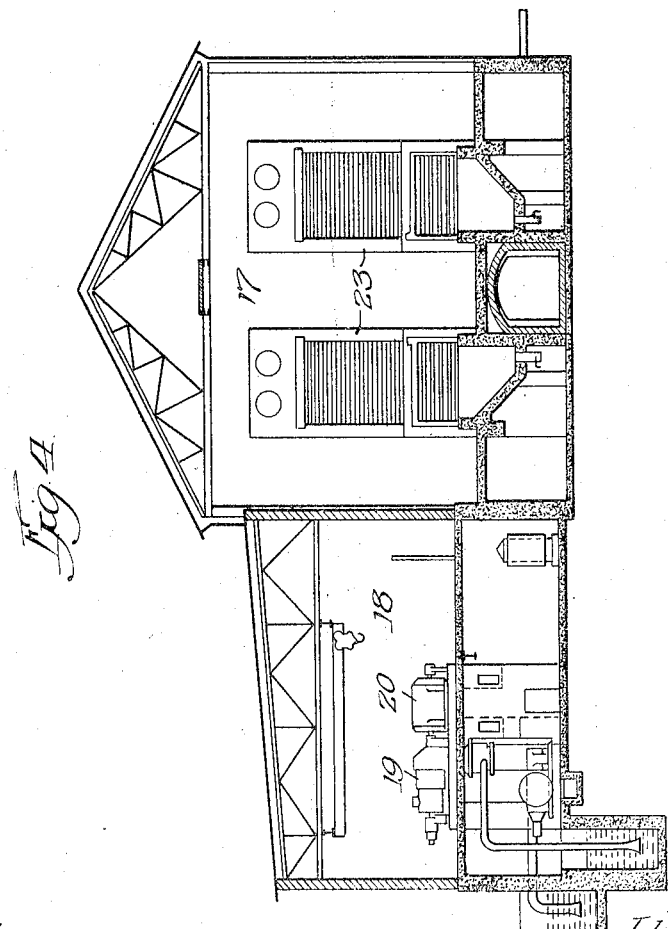

Patented Nov. 10, 1925.

1,561,213

UNITED STATES PATENT OFFICE.

JOHN C. BUCKBEE, OF CHICAGO, ILLINOIS.

STRAIGHT-LINE CEMENT PLANT.

Application filed March 23, 1923. Serial No. 627,050.

*To all whom it may concern:*

Be it known that I, JOHN C. BUCKBEE, a citizen of the United States, residing at Chicago, in the county of Cook and State of Illinois, have invented certain new and useful Improvements in Straight-Line Cement Plants, of which the following is a specification.

The present invention relates to the manufacture of cement and more particularly has to do with the construction and arrangement of the plant and its equipment.

The main and primary object of the invention is to provide a plant wherein the highest economy of time, labor and expense may be effected in its construction, as well as its maintenance, and in which the operations in the treatment of the material from the raw state to the finished product may be accomplished with distinct savings in the cost of such operations.

Furthermore, the invention contemplates the provision of a plant of the character set forth in which the relation of the several units is such as to permit expansion of enlargement of the plant, as such may be required, without impairment of the original installation, and without the necessity of discontinuing the operation of the plant during the period in which such expansion or enlargement may take place.

A further object of the invention is to provide a plant of the character described in which the passage of the material, and the sequence of operations thereon, is in a direct line from the time that the material in its raw state enters the plant until it emerges therefrom in the finished product. This economizes in the area covered by the plant, so that undue waste in the space on which the plant is placed is overcome, and likewise minimizes the time for treatment of the material, thus enabling the finished product to be produced at less expense and with greater facility and ease than under the conditions hitherto existing in the manufacture of cement.

Having these general objects in view, and others which will appear as the nature of the improvements is better understood, the invention consists substantially in the novel construction, combination and arrangement of parts hereinafter fully described, illustrated in the accompanying drawings, and finally pointed out in the appended claim.

In the drawings—

Figure 1 is a sectional plan view of a straight-line cement plant constructed in accordance with the present invention.

Figure 2 is a central longitudinal sectional view thereof.

Figures 3, 4, and 5, are transverse sectional views on the line 3—3, 4—4 and 5—5, respectively of Figure 2.

As before premised, it is the object of the present invention to provide a straight-line cement plant in which the passage of the material, and the sequence of operations thereon, is in a direct line from the time that the material in its raw state enters the plant until it emerges therefrom in the finished product. To this end the invention contemplates a plant of this character all of the departments of which are housed under a single roof and which are in line with each other so that as the material passes from one department to the other it will follow a direct path, and thereby avoid the necessity for utilizing transfer devices and apparatus for transportation of the material to the separated points in which the various departments heretofore have been located. Having these features in mind, the numeral 10 designates the housing of the plant. This may be a building of any desired construction in accordance with modern engineering practice, and it may be formed of any desired material. By reason of the utilization of the present invention, the structure 10 need be of only relatively low height and only sufficient to accommodate the apparatus and equipment disposed therein. Likewise, by the utilization of the invention the width of the structure 10 may be relatively narrow, and because of its construction to accommodate disposition of the various units in a direct line, the structure is devoid of pronounced angular projections, thus adapting the same for the construction of extensions laterally thereof if it be found desirable to increase the size of the plant and the equipment therein.

The raw mill department 11 occupies one end of the housing 10. Within said department are included the usual mills 12, raw bins 13 and elevator 14 for transferring the raw material from an external storage point to the bins 13. In line with the equipment of the raw mill department just described are the slurry tanks 15 into which the material is passed by pumps 16 or the like. Next in line with the raw mill department is the boiler department 17 of the power plant, and here are located boilers which utilize the waste heat from the kilns through which the material is passed as it advances through the plant. At one side of the boiler department 17, and forming part of the same, is a power station 18 in which are located electrical generators 19 operated by turbines 20 which derive their power from the boilers of the department 17. This power station affords the necessary energy for the electric motors, hereinafter referred to, by which the several units are driven.

In line with the boiler department 17 is the kiln room 21, the kilns 22 of which are connected with flues 23 by means of which the waste gases pass from the kilns to the waste heat boilers in the department 17, where said gases are utilized in the firing of these boilers. The opposite ends of the kilns 22 are in line with the powdered coal firing apparatus 23ª by means of which the kilns are heated, the kilns discharging into cooling apparatus 24 from which the material finally passes to the grinding mills 25 of the finishing department 26. From this department 26 the finished material may be passed by suitable conveyors to a stock house or other point of storage.

From the foregoing description it is evident that the arrangement and construction herein delineated affords a straight-line cement plant wherein the material, once it is introduced in the raw state, passes in a direct line from the point of its first treatment, through its intermediate stages of treatment, and to the point of final finishing, so that the apparatus utilized in such treatment is arranged in a direct line, the various departments receiving the material directly from the preceding departments, and without any deviation of the material from such direct path so long as it traverses the several departments in which the same is subjected to treatment.

Various electrical driving units 27 are employed for the operation of the different units, thus affording independent driving of these units, with utilization of power derived from the station 18. The power plant thus is centralized, and the power distributed in a highly advantageous and economical manner, and the compact arrangement of the several treating departments enables the operation and maintenance of the entire plant with maximum economy of time, labor and expense.

While the plant herein illustrated is of the wet type, it will be understood that the invention is equally adaptable to dry plants. In such event the slurry tanks 15 are replaced by bins for the raw material in a dry state.

I claim:

A straight-line cement plant of the class described, comprising a raw mill department, a power station, a kiln department, and a finishing department sequentially arranged and in a direct line with each other, whereby the material introduced in its raw state passes from the raw mill to the finishing department in a direct line.

In witness whereof I have hereunto set my hand.

JOHN C. BUCKBEE.